Dec. 17, 1940.   F. MESINGER   2,225,316
RESILIENT SUPPORT FOR CYCLE SADDLES
Filed June 28, 1937   2 Sheets-Sheet 1

FREDERICK MESINGER, INVENTOR.
BY  *William F. Mesinger*
ATTORNEY.

Dec. 17, 1940.                F. MESINGER                    2,225,316
                  RESILIENT SUPPORT FOR CYCLE SADDLES
                    Filed June 28, 1937        2 Sheets-Sheet 2
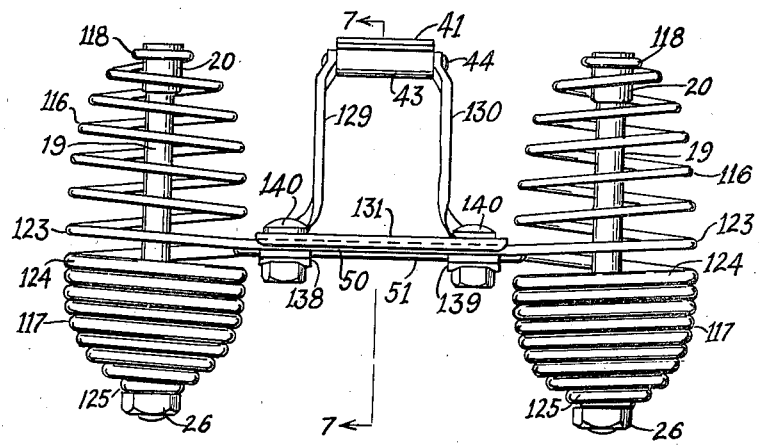
Fig. 5
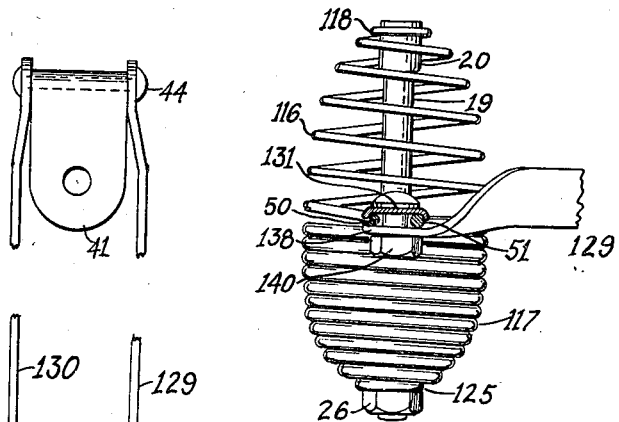
Fig. 6                                          Fig. 7
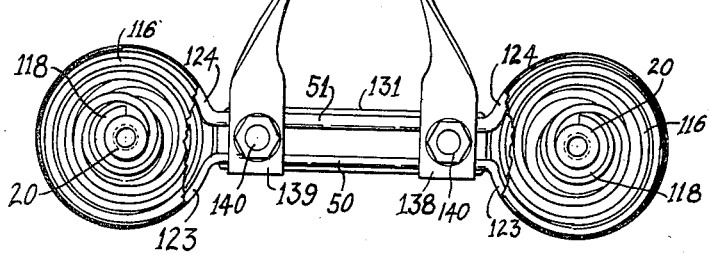
FREDERICK MESINGER, INVENTOR.
BY  *William J. Mesinger*
ATTORNEY.

Patented Dec. 17, 1940

2,225,316

UNITED STATES PATENT OFFICE 2,225,316

RESILIENT SUPPORT FOR CYCLE SADDLES

Frederick Mesinger, Mount Vernon, N. Y.

Application June 28, 1937, Serial No. 150,813

4 Claims. (Cl. 155—5.22)

This invention relates to resilient supports for cycle saddles and more particularly to improved coil spring arrangements for bicycle saddles.

The invention has for its principal object to provide an improved arrangement of co-operating coil springs for supporting a saddle seat which is highly efficient and is economical to manufacture.

It is also an object to provide a compound coil spring arrangement for cycle saddles which provides a desired degree of resilience while permitting a reduction of the height of the compound spring without loss of resilience.

Other objects of the invention are to provide a saddle spring structure in which extension and compression coil springs may be arranged to co-act with each other when closely coupled, to provide improved means for operatively securing such springs to a supporting frame and to provide an arrangement whereby such springs may be arranged in pairs formed from a single piece of wire.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 5 is a rear elevational view of another form of saddle supporting spring structure according to the invention;

Fig. 6 is a plan view of the spring structure shown in Fig. 5 with parts broken away; and Fig. 7 is a fragmentary view of a section taken on the line 7—7 of Fig. 5.

A compound arrangement of coil springs for supporting bicycle saddle seats has been widely used. Such an arrangement of springs in a saddle supporting structure employs the resilient characteristics of two types of coil springs which are connected to the supporting frame and the saddle seat in such a manner that the lower spring is placed in tension and the upper spring which is usually conical, is placed in compression by the weight of the bicycle rider. It is found that good resilience is obtained when the upper spring is formed of thinner wire than the lower spring. The upper end of the conical spring bears against the saddle seat and the lower end of the extension spring is customarily secured to the lower ends of the legs of a yoke which extends axially through the springs. To attach the other ends of each spring to the supporting frame it has been necessary to provide eyes on the springs one being on the lower end of the compression spring and extending downward from the rim on the side toward the frame and the other being formed on the upper end of the lower spring and extending upward from the rim. Both such eyes are then bolted or riveted together and to a portion of the frame. Such an arrangement causes a relatively wide gap between the two springs of the compound unit and causes the springs to be eccentrically loaded whereby excessive distortion results and the efficiency of the springs is impaired.

By the present invention these and other objections are avoided by providing an improved arrangement for securing the two springs together and to the frame whereby the springs are concentrically loaded and whereby the large gap between the springs is eliminated so that improved resiliency is obtained with a material reduction in the height of the spring unit. A further advantage of such reduction of height is the provision of a more compact saddle structure which has improved appearance and saves considerable packaging space when shipped commercially.

Figure 1:
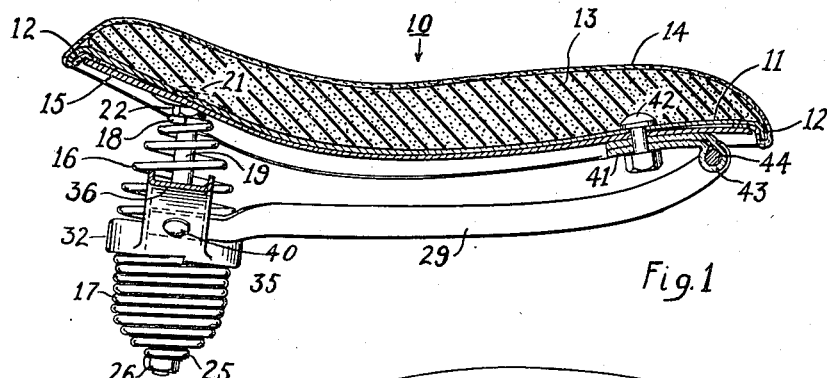
Fig. 1 is a longitudinal sectional view of a saddle having an exemplary spring structure according to the invention.

Referring now to the drawings and particularly to Fig. 1, a saddle is shown having a seat portion, indicated generally at 10, which may be one of any of the varieties of seat portions customarily used. The seat 10 shown has a pressed sheet metal base 11 having a downwardly formed edge flange 12. A sponge rubber cushion 13 is disposed on the upper surface of the base and is covered by a preformed leather top covering 14 having edge portions which are passed around and completely enclose the edge flange 12. A sheet metal bottom plate 15 formed to engage in complete contact with the bottom surface of the base 11 and whose edges are shaped to fit within the flange 12 is provided and secured to the bottom surface of the base 11 so as to clamp the edge portions of the cover 14 between the edges of plate 15 and the flange 12. The cover 14 is thus retained tightly in place and a seat having a smooth edge is provided.

The seat is supported by the improved spring structure which comprises two pairs of coil springs disposed below the rear portion of the seat. Each pair consists of an upper compression spring 16 having coils normally spaced apart and a lower extension spring 17 having coils normally close together, both springs being axially aligned. The coils of the upper spring 16 preferably are smaller in diameter toward the upper end, the last coil 18 being small enough to closely encircle the upper end of a rod 19. The rod passes axially through the two springs and has a slightly enlarged upper end or head 20 which is provided with a threaded hole that engages with the end of a bolt 21. The bolt 21 passes downwardly through both the base 11 and plate 15 and has a head portion disposed in contact with the top surface of the base 11 and a nut 22 engaging with the threaded portion of the bolt is provided for securing the base 11 and plate 15 tightly together and leaving a portion of the bolt extending below to which the rod 19 is secured. The end coil 18 bears against nut 22 for supporting a portion of the weight of a rider upon the seat 10.

The lowermost coil 23 of the spring 16 and the uppermost coil 24 of spring 17 are of the same diameter and closely adjacent each other; they may, if desired, be in contact with each other. The lower coils of spring 17 are smaller in diameter, the last coil 25 encircling the lower end of the axially disposed rod 19 and being secured thereto between a nut 26 threadedly engaging the end portion of the rod and a washer 27 on the upper side of coil 25. The washer 27 bears against projections 28 struck up on the rod 19 above the washer.

Figures 3, 4:
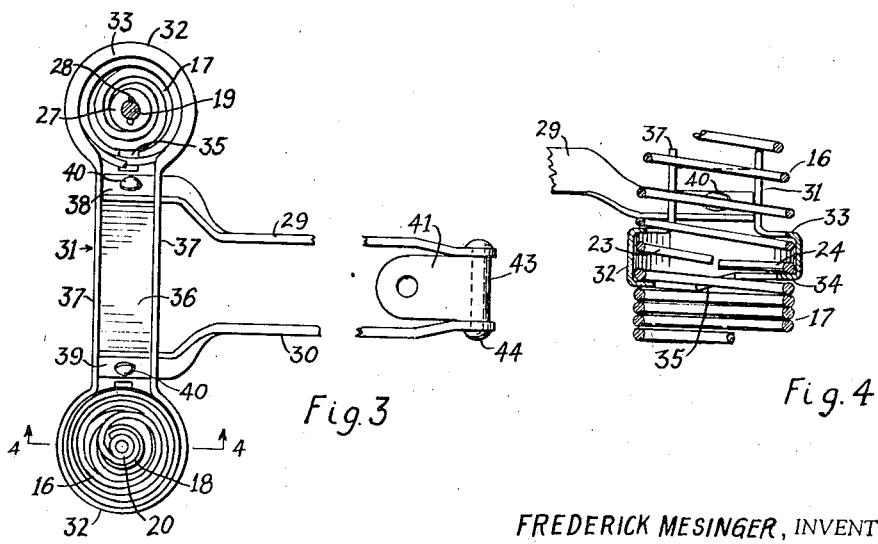
Fig. 3 is a plan view of the supporting frame of the saddle shown in Fig. 1 with parts broken away.
Fig. 4 is an enlarged fragmentary view of a section taken on the line 4—4 of Fig. 3.

The two springs 16 and 17 are secured together and to frame or reach members 29 and 30 by a transverse bridge member 31. The member 31 has ring portions 32 which encircle or surround the coils 23 and 24. The upper and lower rims of the ring 32 are provided with inwardly projecting flanges 33 and 34, the lower flange 34 projecting under coil 24 and the upper flange 33 projecting over coil 23. The coils 23 and 24 are thus secured together within the ring 32 concentrically and without a substantial gap therebetween. A portion of the flange 34 preferably nearest the reach members 29 as clearly shown in Fig. 3, the left compression spring being removed, is cut away to provide an opening 35 thru which the spiral wire of spring 17 may pass. The ring portions 32 are rigidly joined by an arch shaped portion 36 having upturned edges 37 provided to stiffen the arch, the edges 37 being continuous with the rings 32.

The reach members 29 and 30 are formed from rectangular bars having longitudinally disposed parallel portions whose width dimension is vertical and which are spaced apart a distance suitable for support upon a seat pillar by means of a suitable clamp. The rearmost portions 38 and 39 are offset outwardly and twisted at an angle to the parallel portions of the reach members, the angle being such that the end portions 38 and 39 are parallel to the under side walls of the arch 36 respectively. The portions 38 and 39 pass through slots cut in the forward flanges 37 of the arch and are secured to the arch adjacent the ring portions 32 each by a single rivet 40. The forward portions of the members 29 and 30 are upwardly curved and the ends are hingedly secured to the pommel portion of the seat base 11 and plate 15 by means of a hinge clip 41 secured thereto by a bolt 42. The clip 41 has a transverse horizontal loop 43 and the members 29 and 30 are secured to the ends of a rivet 44 passing through the loop.

The weight of the rider causes the rear portion of seat 10 to be depressed, compressing springs 16 between the nuts 22 and the upper coils 24 of springs 17 which are supported on the flanges 34 of the bridge member 31. Simultaneously the rods 19 carry the lower end coils of springs 17 downward stretching springs 17 between the washer 27 and the flange 34. Both springs resist this deflection with a reaction peculiar to their respective shapes and thickness of wire. The upper or compression spring is preferably made of thinner wire although it may be desirable to use wire of equal thickness, for example, the upper and lower springs may be formed of a single continuous piece of wire, the upper portion being openly coiled and the lower portion closely coiled. The frame members 29 and 30 move rigidly with the vehicle which supports them while the seat 10 pivots about the axis of pin 44 to allow the rear portion of the seat to move with respect to the bridge member 31.

It will be seen that the full length of the springs is usefully employed to provide resilience and that there is no inactive gap between them. The loading of the springs is concentric so that the upper spring can cooperate with the lower throughout the full range of movement. With a concentric arrangement the upper springs effectively prevent the lower springs from being overloaded for excessive downward motion of the seat will be stopped by the closing up of the coils of the upper springs.

The springs 16 and 17 are assembled to the bridge member 31 by turning them into the ring portions 32 similar to screw threading.

Figure 2:
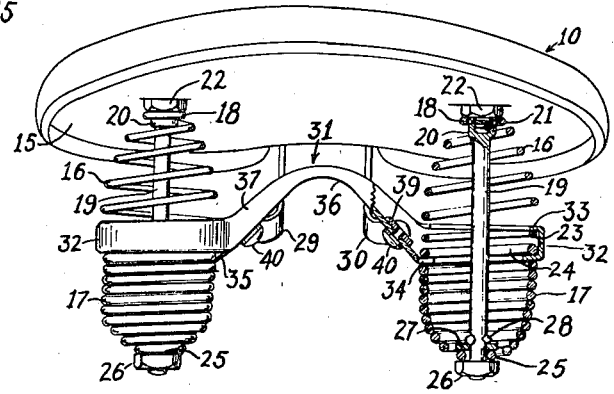
Fig. 2 is a rear end elevational view of the saddle shown in Fig. 1 having parts of one spring broken away.

Another form of resilient seat support according to the invention is shown in Figs. 5, 6 and 7, in which the two upper or compression springs 116 are formed from a single piece of wire, having their lower coils 123 joined by a horizontal portion 50. The uppermost coils 118 of these springs encircle the heads 20 of the rods 19. The pair of lower or extension springs 117 are each concentric with a respective upper spring and have their uppermost coils 124 joined by a horizontal portion 51. The lower coils 125 of the lower springs are secured to the rods 19 between nuts 26 and washers 27 as shown in Fig. 2.

The upper and lower pairs of springs are secured together in operative relation and to the rear portions 138 and 139 of the reach members 129 and 130 respectively by means of bolts 140 which pass through a horizontal strap member 131 between the portions 50 and 51 and thru the reach member end portions 138 and 139 whereby the portions 50 and 51 are secured between the portions 138 and 139 and the member 131 whose longitudinal edges are downwardly formed to prevent the portions 50 and 51 from slipping from under the member 131. The rear portions 138 and 139 are horizontal, being joined to the remainder of the reach members 129 and 130 by a quarter twist. The two portions 50 and 51 of the spring pairs form, together with the strap 131, a bridge which if desired, may be arch shaped. Since the two coils 123 and 124 are continuous with the respective portions 50 and 51, the upper and lower springs of each unit are concentrically supported by the bridge and the whole space between the upper and lower ends of the compound spring unit is occupied by resiliently active coils.

The formation of the upper and lower pairs of springs from a single piece of wire provides greater economy in manufacture and insures against mismating the pairs during assembly.

In both forms of the invention, the elimination of the substantial gap between upper and lower springs provides increased efficiency since greater resilience is obtained from a given height of spring unit or, for an equivalent degree of resilience a considerably shorter and more compact spring unit is provided. The elimination of a gap also provides an improved appearance. The springs co-act concentrically and are not distorted or strained laterally.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a spring support for a saddle seat, a spring unit comprising an extension spring, a compression spring concentric with and above said extension spring, the upper end of said compression spring and the lower end of said extension spring being connected to said seat for deflection thereby, and supporting means for maintaining the lower coil of said compression spring and the upper coil of said expansion spring closely adjacent each other and in helical alignment, said supporting means including an integral ringlike portion encircling both of said coils and having inwardly formed flanges arranged to provide threaded engagement with both of said coils.

2. In a spring support for a saddle seat, the combination comprising a pair of compound coil springs each compound spring comprising an extension spring and a separate compression spring concentric with and above said extension spring, the upper end of the compression springs and the lower end of the extension springs being connected to said seat to support the same, said compression springs being formed of lighter gauge wire than said extension springs; a supporting frame; a transverse bridge member secured to said frame for supporting said compound springs; said bridge member comprising a single sheet metal piece having a pair of ringlike portions each surrounding the central portion of one of said compound springs, said ring portions having inwardly extending flanges making threaded engagement with both the lower portions of said compression springs and the upper portions of the corresponding extension springs and arranged to maintain the extension and compression springs in helical alignment and concentric when loaded, said bridge member also having a bridge portion provided with edge flanges integral with said ring portions and a web joining said edge flanges said frame being secured to the web.

3. A spring support for a saddle seat comprising a pair of extension springs; a pair of separate compression springs each concentric with and above one of said extension springs, the upper ends of said compression springs and the lower ends of said extension springs being connected to said seat for deflection thereby; a transverse member having a pair of ring portions surrounding said springs, and a bridge portion rigidly connecting said ring portions, said ring portions having inwardly formed flanges which make threaded engagement with both the lower portion of the corresponding compression spring and with the upper portion of the corresponding extension spring to maintain said compression and extension springs in helical alignment, said bridge portion having its edges formed to provide side flanges integral with said ringlike portions and a web therebetween; and a supporting frame including a pair of reach bars yieldably connected to the forward portion of the seat and having rearwardly extending tongue portions, said bars being rigidly secured to said bridge portion by passage of said tongues through closely fitted openings in one side flange of said bridge portion, said tongues being each secured to the web of said bridge portion by a single means disposed between the flanges.

4. In a spring support for a saddle seat, a compound spring unit comprising a lower close coiled extension spring portion; an open coiled compression spring portion concentric with and above said extension spring portion, the upper end of said compression spring portion and the lower end of said extension spring portion being connected to said seat for deflection thereby; and supporting means including a transverse bridge member having a ringlike portion substantially encircling both the lower coil of said compression spring portion and the upper coil of said extension spring portion; inwardly formed flanges at the upper and lower edges of said ringlike portion having threaded engagement with both of said coils; and a channel-like bridge portion having side flanges integral with said ringlike portion.

FREDERICK MESINGER.